United States Patent [19]
Browne et al.

[11] Patent Number: 5,139,115
[45] Date of Patent: Aug. 18, 1992

[54] ANTI-LOCK BRAKING INDICATOR SYSTEM

[75] Inventors: Alan L. Browne, Grosse Pointe; Yuen-Kwok Chin, Troy, both of Mich.

[73] Assignee: General Motors Corporation, Detroit, Mich.

[21] Appl. No.: 576,655

[22] Filed: Sep. 4, 1990

[51] Int. Cl.$^5$ ............................ B60T 8/32; B60Q 1/44
[52] U.S. Cl. ...................... 188/1.11; 303/91; 340/463
[58] Field of Search .......... 188/1.11; 303/91; 340/453, 467, 479, 963

[56] References Cited

U.S. PATENT DOCUMENTS

| | | | |
|---|---|---|---|
| 3,911,394 | 10/1975 | Shames | 340/467 |
| 4,206,850 | 6/1980 | Grube | 213/175 |
| 4,418,331 | 11/1983 | Chicoine | 340/467 |
| 4,876,525 | 10/1989 | Gross | 188/1.11 X |
| 5,017,904 | 5/1991 | Browne et al. | 340/467 X |

FOREIGN PATENT DOCUMENTS

| | | |
|---|---|---|
| 0338100 | 4/1988 | European Pat. Off. . |
| 0343399 | 4/1989 | European Pat. Off. . |
| DT 1940256B2 | 8/1969 | Fed. Rep. of Germany . |
| 3520037A1 | 6/1985 | Fed. Rep. of Germany . |
| 3400806 | 7/1985 | Fed. Rep. of Germany ...... 340/453 |
| 3406371 | 8/1985 | Fed. Rep. of Germany ...... 340/479 |
| 3602463 | 7/1987 | Fed. Rep. of Germany ..... 188/1.11 |
| 3629564 | 3/1988 | Fed. Rep. of Germany ..... 188/1.11 |
| 223533 | 12/1984 | Japan ................................. 188/1.11 |
| 599014 | 7/1975 | Switzerland . |

*Primary Examiner*—Robert J. Oberleitner
*Assistant Examiner*—Alfred Muratori
*Attorney, Agent, or Firm*—Edward J. Biskup

[57] ABSTRACT

A vehicle braking indicator system that provides a continuous lighting of the vehicle stop light under normal braking conditions but causes the stop light lamp to be intermittently lighted at a relatively high frequency when the anti-lock braking system of the vehicle is activated and maintains the intermittent lighting of the stop light lamp after the anti-lock braking system is deactivated.

6 Claims, 2 Drawing Sheets

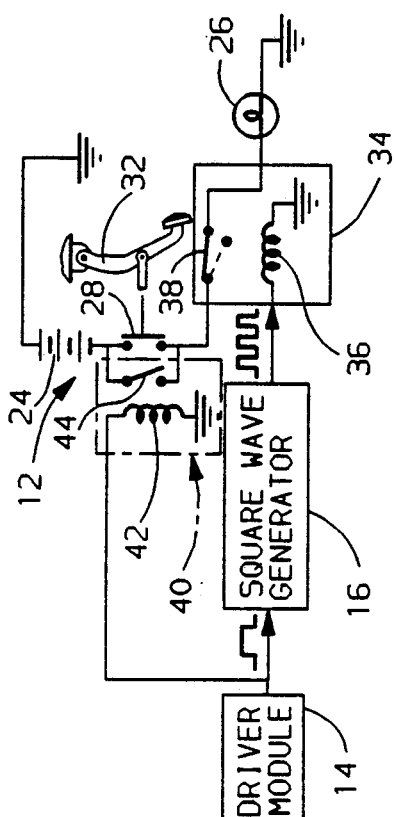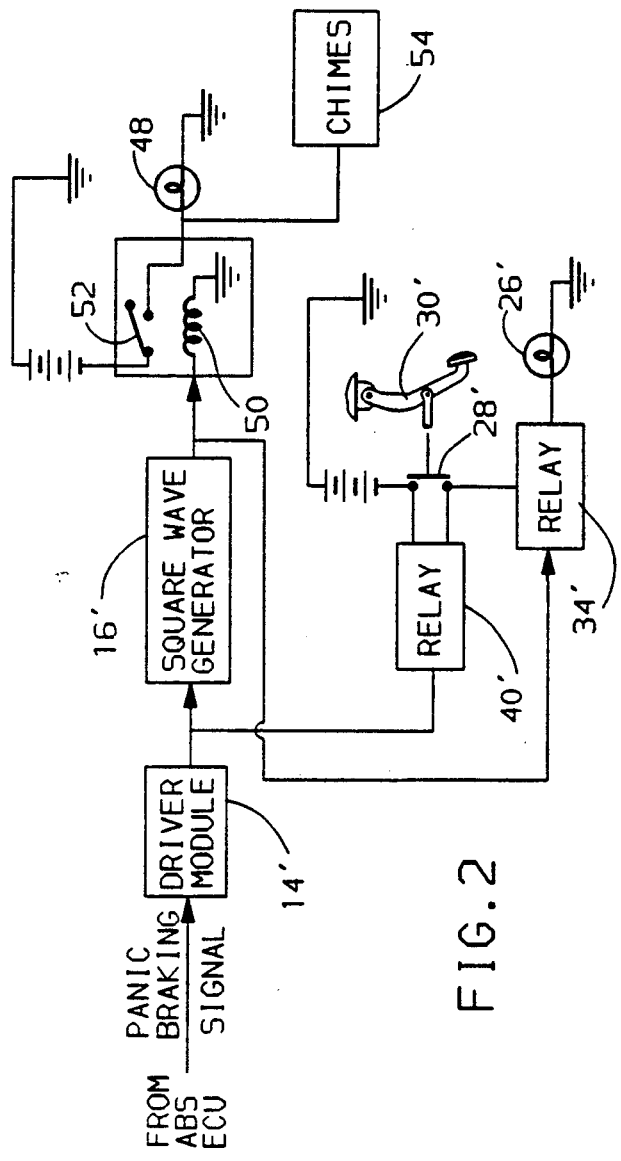

ANTI-LOCK BRAKING INDICATOR SYSTEM

BACKGROUND OF THE INVENTION

This invention concerns braking systems for motor vehicles and more particularly concerns a braking indicator system which causes a stop light to provide a flashing signal to a following vehicle whenever the anti-lock braking system of the vehicle is activated and maintains the flashing signal for a time period after the anti-lock braking system is no longer active.

In order to prevent wheel lockup when excessive brake pressure is applied to the wheel brakes by the vehicle operator and to maintain a stable braking condition, it is becoming quite common for present day vehicles to have an electronically controlled anti-lock braking system. In general, these systems respond to parameters derived from wheel speed, such as wheel acceleration or deceleration and wheel slip, to control or limit the pressure applied to the wheel brakes. Generally, these systems provide for a decrease in brake pressure when an incipient wheel lockup condition is detected to allow the vehicle to recover from the incipient lockup condition followed by a reapplication of braking pressure to the wheel. This cycle is rapidly repeated until the vehicle stops or until the operator applied braking pressure is reduced to a level below that which produces an incipient wheel locking condition.

SUMMARY OF THE INVENTION

The present invention intends to combine the anti-lock braking system of the type described above with the stop light electrical circuit in a manner so as to cause the stop light to flash at a predetermined high rate when the brake pedal is depressed but only when the anti-lock brake system is activated. In addition, even after the anti-lock brake system is deactivated, the stop light will continue to flash until the accelerator is depressed or, in the alternative, until a predetermined time interval has elapsed or a manual switch is opened. According to the present invention, this is realized by providing a braking indicator system which includes an electric circuit having a normally closed relay which allows continuous energization of the stop lamp upon depression of the brake pedal if the anti-lock braking system is not activated. However, upon depression of the brake pedal under conditions which cause the activation of the anti-lock braking system, drive means serve to rapidly open and close the normally closed relay causing the stop light to provide a flashing signal so as to indicate to the following vehicle that the anti-lock braking system is controlling the braking of the vehicle. When the anti-lock braking system is deactivated, the electric circuit will maintain the flashing signal until the accelerator pedal is depressed or a set time period expires or a conveniently located manual switch is opened by the vehicle operator. In the preferred form of the present invention, the drive means for providing this result includes a drive module and a square wave generator connected in series between the electronic control unit of the anti-lock braking system and the normally closed relay. Thus, when the anti-lock braking system is activated due to excessive brake pressure being applied to the wheel brakes resulting in an incipient wheel locking condition, the electronic control unit will provide an output from a discrete output port which is received by the driver module. The driver module, in turn, generates a drive signal which is received by the square wave generator and causes the latter to open and close the relay at a predetermined high rate so that the stop light intermittently is energized and deenergized to convey the message to the following vehicle that the braking vehicle's anti-lock brake system has been activated. When the anti-lock braking system is activated, the electronic control unit sets a counter to "N", a value which establishes a predetermined calibrated length of time for the electronic control unit to provide a panic braking signal to maintain the driver module active after the anti-lock braking is terminated. The panic braking signal is maintained continuously on as long as the anti-lock braking system is active. When the anti-lock braking system becomes inactive, the panic braking signal is continued for a length of time established by the value N unless a manual switch is closed or the throttle position is greater than a low calibration value indicating the vehicle operator has depressed the accelerator pedal.

In a modified form of the invention, the braking indicator system not only causes the vehicle stop light lamp to flash when the anti-lock braking system is activated but also serves to inform the driver visually and audibly of the activation of the anti-lock braking system and maintains such visual and audible signals until the stop light flashing is deactivated in the manner explained above. In the modified system, the square wave generator serves to drive a normally open switch to pulse the anti-lock braking system telltale light on the instrument panel of the vehicle. In addition to pulsing the anti-lock braking system telltale light, the square wave generator interfaces with chimes to indicate to the driver of the activation of the anti-lock braking system.

A disclosure of a brake system which has certain similarities to the present invention but does not incorporate all of the features thereof can be seen in U.S. Pat. No. 4,876,525, entitled "Emergency Warning Brake System", issued on Oct. 24, 1989 in the name of Gross.

The objects of the present invention are to provide a new and improved braking indicator system for a motor vehicle which causes the stop light to flash at a predetermined high frequency only when the anti-lock braking system of the vehicle is activated and maintains the flashing of the stop light until certain conditions occur or a predetermined time interval elapses; to provide a new and improved braking indicator system which includes switch means in the stop light electric circuit that is automatically opened and closed at a predetermined frequency so as to cause the stop light to flash whenever the vehicle anti-lock braking system is activated and which serves to maintain the flashing of the stop light until the accelerator pedal is depressed or a predetermined time interval has elapsed; to provide a new and improved braking indicator system for a vehicle that provides a visual signal to the following vehicle and an audible and visual signal to the driver of the leading vehicle that its anti-lock braking system has been activated as a result of depression of the brake pedal and which maintains all of such signals until either the throttle position of the engine is sensed as being activated or a predetermined time interval has elapsed; and to provide a new and improved vehicle braking indicator system that provides a continuous energization of the vehicle stop light under normal braking conditions, but which causes the stop light to be intermittently energized at a relatively high frequency when the anti-lock braking system of the vehicle is activated and maintains the intermittent energization of the stop light until the vehicle's throttle is activated or if a predetermined amount of time has expired, whichever occurs first.

Other objects and advantages of the present invention will be more apparent from the following detailed description when taken with the drawings in which

BRIEF DESCRIPTION OF THE DRAWINGS

FIG. 1 is a schematic diagram of a braking indicator system for a motor vehicle made in accordance with the present invention; and FIG. 2 is a modified form of the braking indicator system shown in FIG. 1;

DETAILED DESCRIPTION OF THE PREFERRED EMBODIMENTS

Figure 3:
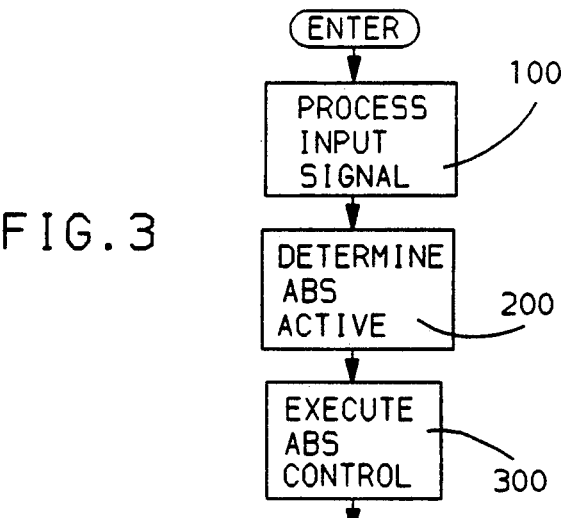
FIG. 3 is a flow diagram illustrating the operation of the electronic control unit in accordance with the principles of this invention.

Referring now to the drawings and more particularly FIG. 1 thereof, a motor vehicle brake indicator system is shown which includes an electrical stop light system combined with an electronic control unit (ECU) 10 of an anti-lock braking system (ABS) which, in turn, is coupled to the electrical circuit portion 12 of the stop light system through a driver module 14 and a square wave generator 16.

The ECU 10 serves to execute the antilock braking routine illustrated in FIG. 3 and generally takes the form of digital computer based controller. The controller includes a microprocessor that is standard in form and includes the standard elements such as a central processing unit which executes an operating program permanently stored in a read-only memory which also stores tables and constants, an analog-to-digital converter, a random access memory and input/output circuitry utilized to provide control signals to a driver interface circuit. The analog output from a sensor 18 as to the position of the vehicle throttle 20 is provided to the analog-to-digital converter which converts the signal to digital form. The output of a manual switch 22 is provided to a discrete input port of the ECU 10 as well as other signals such as wheel speed signals from the output of an interface and squaring circuit having in turn an input from wheel sensors. The ECU 10 may take the form of a Motorola single chip microcomputer MC68HC11.

More specifically, the electrical circuit portion 12 of the stop light system includes a source of electrical power such as a battery 24, a motor vehicle rear stop light lamp 26, and a normally open brake switch 28 which is adapted to be closed by the vehicle driver upon depression of a conventional brake pedal 30 which is suitably supported for pivotal movement by a pivotal connection 32. In addition, switch means 34 in the form of a relay is located in series with the brake switch 28 and the lamp 26 and includes the usual relay coil 36 which, when energized, opens normally-closed contacts 38. Thus, during normal braking conditions when the anti-lock braking system is not activated, depression of the brake pedal 30 by the vehicle operator causes continuous energization of the lamp 26 which is then visible to the following vehicle. It will be noted that an additional switch means 40 in the form of a relay is located in parallel with the brake switch 28 and includes the usual relay coil 42 which, when energized, closes normally-open contacts 44.

When braking conditions are such that wheel lockup of one or more of the vehicle wheels may occur, the anti-lock braking system will be activated so as to maintain a stable braking condition. When this occurs, the ECU 10 will execute the anti-lock braking routine illustrated in FIG. 3. In this regard, the read only memory of the microprocessor contains the instructions necessary to implement the algorithm as diagrammed in that figure. The antilock control functions are performed by executing a control cycle in response to each of repeated control cycle interrupts which are generated at predetermined fixed intervals such as five milliseconds. Upon the occurrence of a control cycle interrupt, the digital computer begins executing the functions embodied in the control cycle.

Thus, at step 100, the various input signals are read and stored and individual wheel speeds are computed. Thereafter, the routine determines at step 200 the individual wheel accelerations and the individual wheel slip values. From the computed values of wheel acceleration and wheel slip, the program determines whether or not those parameters represent the need for antilock brake pressure modulation for any wheel. If antilock control of wheel brake pressure is required, the program proceeds to a step 300 where antilock brake control functions are executed and the Time-Out Control subroutine at step 400 is then performed.

When the ABS is active in response to wheel braking upon operation of the brake pedal 30 and for a predetermined time after the ABS becomes inactive, a panic braking signal from a discrete output port of the anti-lock braking systems ECU 10 is coupled to the drive module 14 which provides a drive signal to the square wave generator 16 and, at the same time, causes energization of the relay coil 42 to close the switch contacts 44. The output from the drive module 14 is typically a discreet voltage signal for enabling the square wave generator 16 and for energizing the relay coil 42. As a result, the square wave generator 16 delivers a square wave with a predetermined frequency such as, for example, between 3 to 5 Hz to the relay coil 36 causing the latter to be intermittently energized and deenergized so as to open and close the contacts 38. This, in turn, causes a flashing of the stop light lamp 26 to alert the following driver that the anti-lock braking system of the vehicle has been activated.

Figure 4:
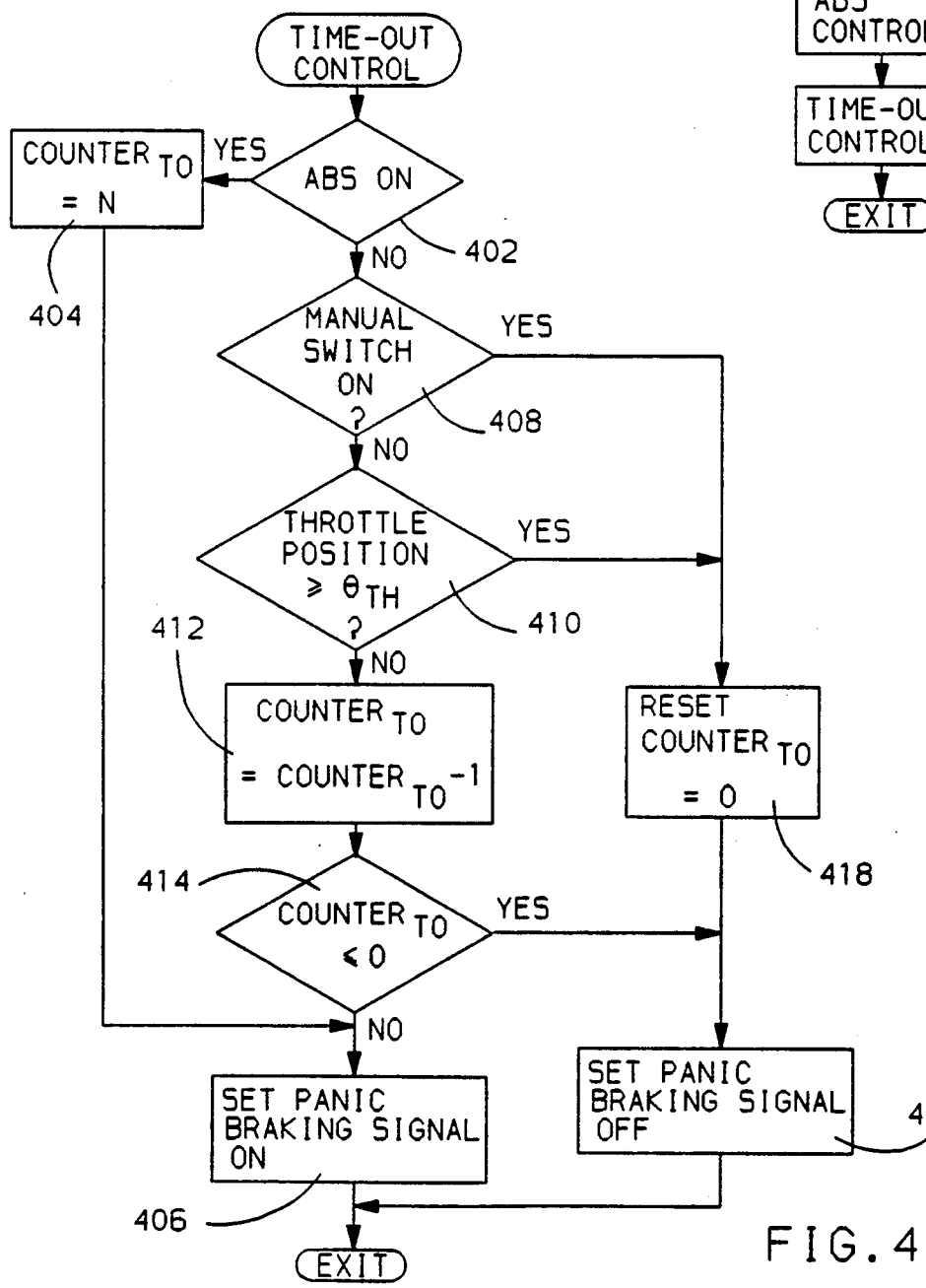
FIG. 4 is a flow diagram illustrating the operation of the Time-Out Control seen in FIG. 3.

The time-out control routine 400 for establishing the panic braking signal is illustrated in FIG. 4. As previously indicated, this routine is executed in response to each of the repeated control cycle interrupts. If the ABS is active as determined at step 402, a counter is set to "N" at step 404. The value of N establishes a predetermined calibrated length of time, such as sixty seconds, for the ECU 10 to provide the panic braking signal to maintain the driver module 14 active after the anti-lock braking is terminated. The panic braking signal is set on at the next step 406 and is maintained continuously via step 406 as long as step 402 determines that ABS is active.

When ABS then becomes inactive as determined at step 402, the panic braking signal is continued for a length of time established by the value of N unless the manual switch 22 is closed as sensed at step 408 or unless the throttle position is greater than a low calibration value indicating the vehicle operator has depressed the accelerator pedal as sensed at step 410. Assuming first that these conditions do not exist, the counter is repeatedly decremented at step 412 with each execution of the control cycle. As long as the count is greater than zero as sensed at step 414, step 406 maintains the panic braking signal on to continue the flashing of the brake signal. When the predetermined time period established by the count N expires as sensed at step 414, the panic braking signal is terminated at step 416.

If at any time after step 402 determines the ABS is inactive, the panic brake signal is terminated independent of the count N to terminate the flashing of the brake lights if the manual switch 22 is operated or if the operator opens the throttle from a closed position. If either of these conditions are sensed by steps 408 or 410, the counter is reset to zero at step 418 and the panic braking signal is terminated at step 416.

It should be apparent from the above that the invention allows the vehicle operator to provide a flashing signal to a following automobile whenever the ABS is activated. In addition, after the ABS is deactivated, (for example, by the vehicle operator bringing the vehicle to a complete stop) the flashing of the stop light lamp 26 will continue for the predetermined time period set in the ECU 10 unless the manual switch 22 is placed in the OFF position or the accelerator pedal is depressed.

A modified form of the invention is shown in FIG. 2 in which the components corresponding to those shown in FIG. 1 are identified by the same reference numerals but primed. In this case, the braking indicator system not only causes the stop light lamp 26 to flash when the anti-lock braking system is activated, but also serves to inform the driver visually and audibly of the activation of the anti-lock braking system. Thus, as seen in FIG. 2, the square wave generator 16' can serve to drive a relay 46 to pulse a ABS telltale light 48 on the instrument panel of the vehicle. In this instance, it will be noted that the relay 46 includes a relay coil 50 and normally-open contacts 52 so that the lamp 48 is not energized until the ABS is activated. In addition to pulsing the ABS telltale light 48, the relay 46 interfaces with chimes 54 (such as currently used to indicate on GM vehicles that the headlamps are still lit after the ignition key is turned to the "off" position) and thereby informs the driver of the activation of the ABS. As would be understood to those skilled in the art, this invention can similarly be implemented for traction control systems operating during vehicle acceleration.

Various changes and modifications can be made in the system disclosed herein without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a vehicle having a rear end, a braking indicator system, said vehicle having an anti-lock braking system including an anti-lock electronic control unit, a brake pedal, and a stop light lamp mounted on the rear end of said vehicle, an electric circuit including means providing for continuous energization of said stop light lamp upon depression of said brake pedal and for flashing of said stop light lamp when said anti-lock braking system is activated, means electrically connected between said anti-lock electronic control unit and said electric circuit for automatically causing the electric circuit to provide a flashing signal of said stop light lamp upon activation of said anti-lock braking system and to automatically continue the flashing of said stop light lamp after deactivation of said anti-lock braking system, and manually operated means providing an input signal to the electronic control unit for terminating the flashing of said stop light lamp.

2. The braking indicator system of claim 1 wherein said vehicle includes a passenger compartment having a manually operated switch, and said manually operated means providing an input signal to said electronic control unit for terminating the flashing of said stop lamp includes said manually operated switch.

3. The braking indicator system of claim 1 wherein said vehicle includes an accelerator pedal, and said manually operated means providing an input signal to said electronic control unit for terminating the flashing of said stop light lamp includes said accelerator pedal.

4. In combination with a vehicle having a passenger compartment and a rear end, a braking indicator system for said vehicle having an anti-lock braking system, a brake pedal, an accelerator pedal, and a stop light lamp mounted on the rear end of said vehicle, an electric circuit including a normally open switch means and a normally closed switch means providing continuous energization of said stop light lamp upon depression of said brake pedal under normal braking conditions, means electrically connected to said normally closed switch means for automatically causing said stop light lamp to provide a flashing signal upon activation of said anti-lock braking system, said means electrically connected including an anti-lock electronic control unit providing an output signal from a discrete output port when the anti-lock braking system is activated and for maintaining said output signal after the anti-lock system is deactivated, means including said accelerator pedal providing an input signal to said electronic control unit to discontinue the flashing of the stop light when said accelerator pedal is depressed, a driver module for receiving said output signal from said electronic control unit and for generating a drive signal, and a square wave generator interfacing with said normally open switch means and said normally closed switch means so that upon receiving said drive signal the square wave generator causes said normally closed switch means to open and close at a predetermined frequency so as to provide said flashing signal of said stop light lamp.

5. The braking indicator system of claim 4 wherein said vehicle includes a sound generating device in the passenger compartment and said electric circuit includes a second normally open switch means for causing said sound generating device to provide an audible signal to the vehicle operator upon activation of said anti-lock braking system.

6. The braking indicator system of claim 5 wherein said vehicle includes a telltale light in the passenger compartment and said second normally open switch means causes both said sound generating device and said telltale light to be energized upon activation of said anti-lock braking system.

* * * * *